United States Patent
Hosokawa et al.

[11] Patent Number: 5,864,391
[45] Date of Patent: Jan. 26, 1999

[54] RADAR APPARATUS AND A VEHICLE SAFE DISTANCE CONTROL SYSTEM USING THIS RADAR APPARATUS

[75] Inventors: Toshio Hosokawa, Kariya; Takekazu Terui, Tokai; Shinji Namba, Kariya, all of Japan

[73] Assignee: Denso Corporation, Kariya, Japan

[21] Appl. No.: 826,511

[22] Filed: Apr. 3, 1997

[30] Foreign Application Priority Data

Apr. 4, 1996 [JP] Japan .................................. 8-082869

[51] Int. Cl.⁶ ......................................... G01C 3/08
[52] U.S. Cl. ........................................ 356/4.01; 356/5.01
[58] Field of Search .................... 356/4.01, 5.01

[56] References Cited

U.S. PATENT DOCUMENTS

| | | | |
|---|---|---|---|
| 4,733,072 | 3/1988 | Lettington | 250/235 |
| 4,929,952 | 5/1990 | Schneider et al. | |
| 5,648,852 | 7/1997 | Kato et al. | 356/375 |

FOREIGN PATENT DOCUMENTS

| | | |
|---|---|---|
| 62-008119 | 1/1987 | Japan . |
| 62-109018 | 5/1987 | Japan . |
| 4-021124 | 1/1992 | Japan . |
| 4-043500 | 2/1992 | Japan . |
| 4-249785 | 9/1992 | Japan . |
| 4-279890 | 10/1992 | Japan . |
| 5-045600 | 2/1993 | Japan . |
| 5-092768 | 12/1993 | Japan . |
| 6-059038 | 3/1994 | Japan . |
| 6-083998 | 3/1994 | Japan . |
| 6-094836 | 4/1994 | Japan . |
| 6-138232 | 5/1994 | Japan . |
| 6-083511 | 11/1994 | Japan . |

*Primary Examiner*—Mark Hellner
*Attorney, Agent, or Firm*—Pillsbury Madison & Sutro LLP

[57] ABSTRACT

A radar apparatus comprises a rotary polygon mirror with a plurality of mirror surfaces inclined at different angles. A semiconductor laser diode and a collimator lens are disposed above the polygon mirror. An infrared pulse beam emitted from the semiconductor laser diode is reflected by a reflection mirror disposed at an upper position in front of the polygon mirror to reflect the pulse beam obliquely downward toward the rotary polygon mirror so that the pulse beam is reflected as a transmission beam advancing toward a measuring area in a forward direction. A light receiving means receives the transmission beam returned from an object positioned within the measuring area.

12 Claims, 13 Drawing Sheets

TOP VIEW

FRONT VIEW

TOP VIEW

FRONT VIEW

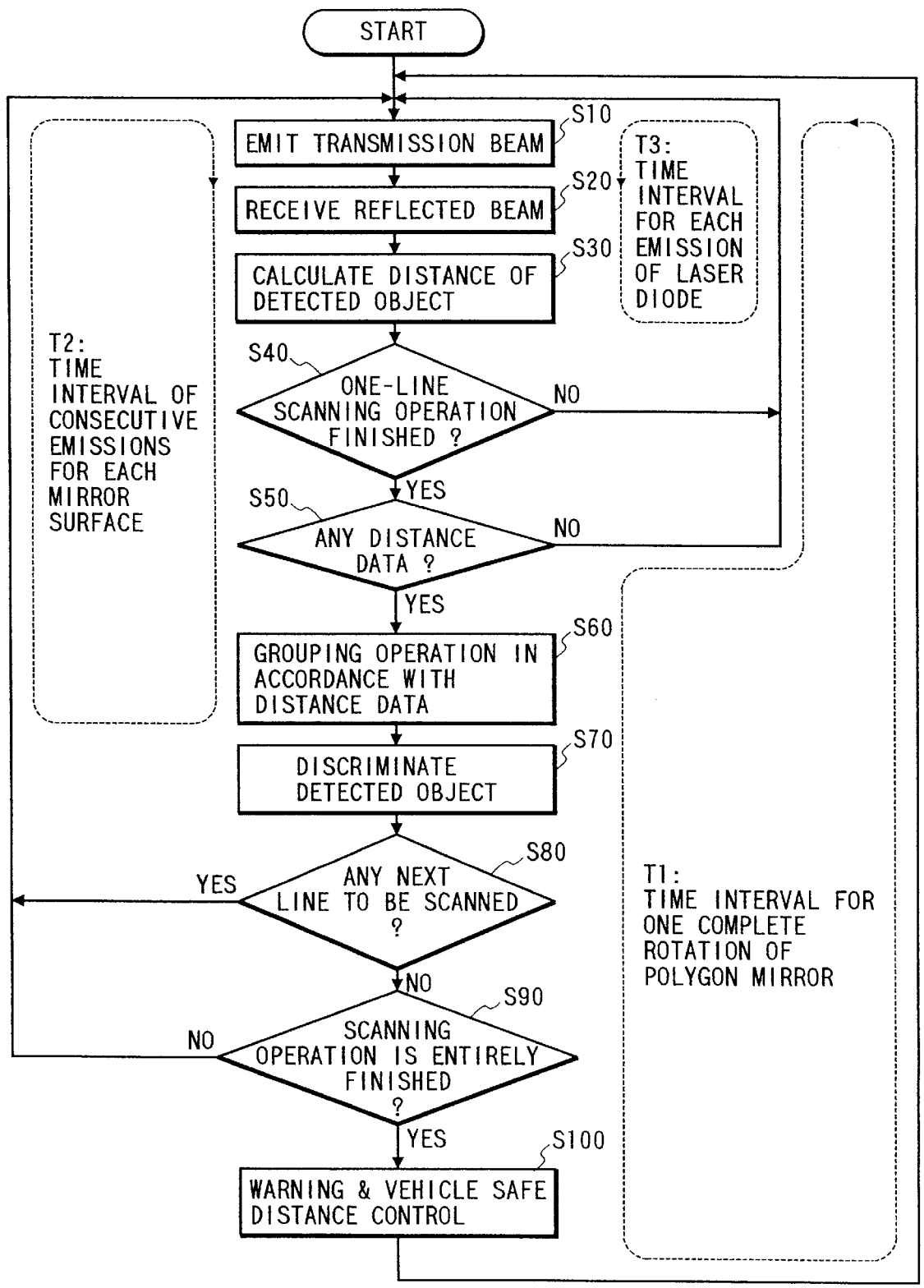

RADAR APPARATUS AND A VEHICLE SAFE DISTANCE CONTROL SYSTEM USING THIS RADAR APPARATUS

BACKGROUND OF THE INVENTION

1. Field of the Invention

This invention relates to a radar apparatus detecting a preceding object and measuring relative data, such as distance, direction and speed, of the detected object, and more particularly to a radar apparatus performing a two-dimensional scanning operation using a rotary polygon mirror having a plurality of mirror surfaces inclined at different angles, and further relates a vehicle safe distance control system incorporating this radar apparatus.

2. Related Art

Unexamined Japanese Patent Application No. 62-8119, published in 1987, discloses such a rotary polygon mirror having a plurality of mirror surfaces inclined at different angles.

This kind of radar apparatus is preferably used to perform a two-dimensional scanning operation using a laser beam, which is for example applied to a vehicle safe distance control system which detects a preceding vehicle and maintains a safe distance based on the detected distance between the radar and the preceding vehicle.

In general, using a rotary polygon mirror in the two-dimensional scanning operation is advantageous in costs, life cycle and reliability of the radar apparatus.

SUMMARY OF THE INVENTION

A principal object of the present invention is to improve this kind of radar apparatus based on a rotary polygon mirror with a plurality of mirror surfaces inclined at different angles.

An object of the present invention is to optimize the direction of a pulse beam irradiated to the mirror surfaces of the rotary polygon mirror.

An object of the present invention is to provide a radar apparatus capable of setting an optimum measuring area symmetrical in the lateral direction to eliminate the imbalance of the vertical scanning angle at right and left edges of the measuring area.

Another object of the present invention is to provide a radar apparatus capable of setting an optimum measuring area free from undesirable distortion.

Furthermore, another object of the present invention is to eliminate any undesirable gap (or insensible zone) produced between scanning lines laterally extending in a given measuring area to prevent any failure in the detection of obstacles.

Still further, an object of the present invention is to provide a radar apparatus generating a transmission beam capable of realizing a wide measuring area without lowering its power density or without reducing a reachable distance.

Yet further, another object of the present invention is to reduce the size of a radar apparatus, more particularly the size of its laser emitting optics.

Still further, another object of the present invention is to provide a radar apparatus having excellent resolution in a scanning angular direction.

Furthermore, another object of the present invention is to provide a radar apparatus having a sufficient data processing time in the computations for distance, angle or speed of a detected object.

Still further, another object of the present invention is to provide a radar apparatus capable of increasing the maximum emitting frequency of a laser diode.

Yet further, another object of the present invention is to incorporate this novel and excellent radar apparatus into a vehicle safe distance control system to increase the reliability of this kind of safety equipment for the vehicles.

In order to accomplish above-described and other related objects, the present invention provides a novel and excellent radar apparatus whose features are explained with reference to FIGS. 1 to 3 hereinafter.

As shown in FIGS. 1 and 2, a rotary polygon mirror M1 is provided and rotatable about its rotational axis. This rotary polygon mirror M1 has a plurality of mirror surfaces along its outer periphery (i.e., on its outskirts). These plural mirror surfaces are inclined at different angles with respect to the rotational axis of the rotary polygon mirror M1. A light source M2 emits a pulse beam $L_{IN}$ which is reflected by a reflection mirror M3 and advances toward the rotary polygon mirror M1. Then, the beam is transmitted toward a predetermined measuring area AR.

As shown in FIG. 1, a three-dimensional coordinate system is defined by Y axis parallel to the rotational axis of the rotary polygon mirror M1, Z axis extending from the rotary polygon mirror M1 to a center of the measuring area AR, and X axis normal to both of the Y axis and the Z axis. In this three-dimensional coordinate system, the pulse beam $L_{IN}$ is irradiated to the mirror surfaces of the polygon mirror M1 from a direction inclined at a predetermined angle φv with respect to an XZ plane.

According to this arrangement, it becomes possible to prevent the interference between the pulse beam $L_{IN}$ entering to the mirror surface of the rotary polygon mirror M1 and the transmission beam outgoing from the mirror surface of the rotary polygon mirror M1. As a best arrangement, the pulse beam $L_{IN}$ can enter along the YZ plane. This is effective to suppress vertical distortions caused at the both ends of the measuring area AR and to eliminate insensible clearance (gap) between scanning lines extending laterally in the measuring area AR.

The effect of the present invention will be explained in more detail with reference to FIG. 2. In FIG. 2, φh representing an angle formed between the pulse beam $L_{IN}$ and YZ plane can be decreased. This angle φh is reduced by shifting the reflection mirror M3 forward (i.e., from the position indicated by a solid line to the position indicated by a dotted line) as shown in FIG. 2. However, shifting the reflection mirror M3 too much forward is not preferable in that the overall size of the radar apparatus becomes large.

In this respect, according to the present invention, the beam emitting optics (i.e., light source M2 and reflection mirror M3) can be disposed in an offset relationship to the rotary polygon mirror M1 in the up-and-down direction. More specifically, as shown in FIG. 3, the light source M2 and reflection mirror M3 can be located at a higher level than the rotary polygon mirror M1. Thus, the angle φh can be easily reduced to zero without increasing the size of the radar apparatus (i.e., without protruding the reflection mirror M3 too much).

According to the features of preferred embodiments of the present invention, the pulse beam $L_{IN}$ is irradiated to the mirror surfaces of the rotary polygon mirror M1 at the angle φh in a range of ±48° with respect to the YZ plane in the given three-dimensional coordinate system. More preferably, the angle φh is in a range of ±35° with respect to the YZ plane. Still further, it is preferable that the pulse beam $L_{IN}$ is irradiated to the mirror surfaces at the angle φh within a given scanning angular zone in the X direction in the three-dimensional coordinate system.

Regarding the vertical angle of the pulse beam $L_{IN}$, it is preferable that the pulse beam $L_{IN}$ is irradiated to the mirror surfaces at the angle φv whose absolute value is in a range of 25° to 70° with respect to the XZ plane in the three-dimensional coordinate system. More preferably, the absolute value of angle φv is in a range of 35° to 60° with respect to the XZ plane.

The setting of the preferable range of vertical angle φv will be explained in more detail with reference to FIG. 3.

The vertical angle φv is reduced by shifting the reflection mirror M3 forward (i.e., from solid line to alternative long and short dash line) as shown in FIG. 3. However, protruding the reflection mirror M3 too much is not preferable because the overall size of the radar apparatus is increased as understood from the illustration of FIG. 3. On the other hand, the vertical angle φv is increased by shifting the reflection mirror M3 backward (i.e., from solid line to dotted line) as shown in FIG. 3. In this case, the inclination angle (φt which is later described) of the rotary polygon mirror M1 needs to be increased. However, increasing the inclination angle too much leads to an increase of the size of rotary polygon mirror M1. This is not preferable because the overall size of the radar apparatus is increased as understood from the illustration of FIG. 3.

Furthermore, another factor determining the preferable range of vertical angle φv is related to an emitting frequency of the pulse beam which is used to scan the given measuring area AR entirely. As explained later, the emitting interval is reduced with increasing vertical angle φv. In other words, the interval for each emission of the pulse beam is extended with increasing vertical angle φv. This is effective to secure an ample time for processing measuring data.

From the foregoing, the preferable range of the vertical angle φv should be determined by considering the overall size of the radar apparatus and the emitting frequency. And, the above numerical limitations are derived from such analysis.

According to other features of the preferred embodiments of the present invention, it is preferable that a converging means is provided to converge light emitted from the light source M2 to the rotary polygon mirror M1. With this arrangement, it becomes possible to reduce the power of the transmission beam.

Furthermore, it is preferable that the reflecting mirror M3 is provided to direct the pulse beam $L_{IN}$ toward the rotary polygon mirror M1. This is advantageous in reducing the overall size of the radar apparatus.

Still further, it is preferable that a calculating means is provided for calculating a relative distance of the object from the radar apparatus based on a difference between generation of the pulse beam $L_{IN}$ and reception of the transmission beam returned from the object positioned in the measuring area AR. As explained above, the vertical angle φv is determined to give an ample time for processing measuring data. Thus, the calculating means can perform complicated computations to detect the object accurately.

More specifically, the radar apparatus of the present invention comprises a rotary polygon mirror with a plurality of mirror surfaces inclined at different angles with respect to a rotational axis of the rotary polygon mirror, a reflection mirror disposed at an upper front position spaced from the rotary polygon mirror for receiving a pulse beam emitted from a light source and reflecting the pulse beam obliquely downward toward the rotary polygon mirror so that the pulse beam is reflected as a transmission beam advancing toward a measuring area in a forward direction, and a light receiving element for receiving the transmission beam returned from an object positioned within the measuring area.

In this arrangement, it is preferable that the reflection mirror is disposed at a direct upper front position with respect to the rotary polygon mirror while the light source is positioned above the rotary polygon mirror. With this arrangement, the radar system can be effectively downsized.

Yet further, it is preferable that the radar apparatus of the present invention is associated with a judging means for discriminating whether the object located in the measuring area is a true obstacle and a safe distance control means for controlling deceleration control means to maintain a safe distance between the radar apparatus and the object when the object is a true obstacle. With this arrangement, it becomes possible to increase the reliability of a vehicle safe distance control system.

BRIEF DESCRIPTION OF THE DRAWINGS

The above and other objects, features and advantages of the present invention will become more apparent from the following detailed description which is to be read in conjunction with the accompanying drawings, in which:

FIG. 19 is a flowchart showing an operation of the vehicle safe distance control system in accordance with the second embodiment of the present invention.

DESCRIPTION OF THE PREFERRED EMBODIMENTS

Figure 1:
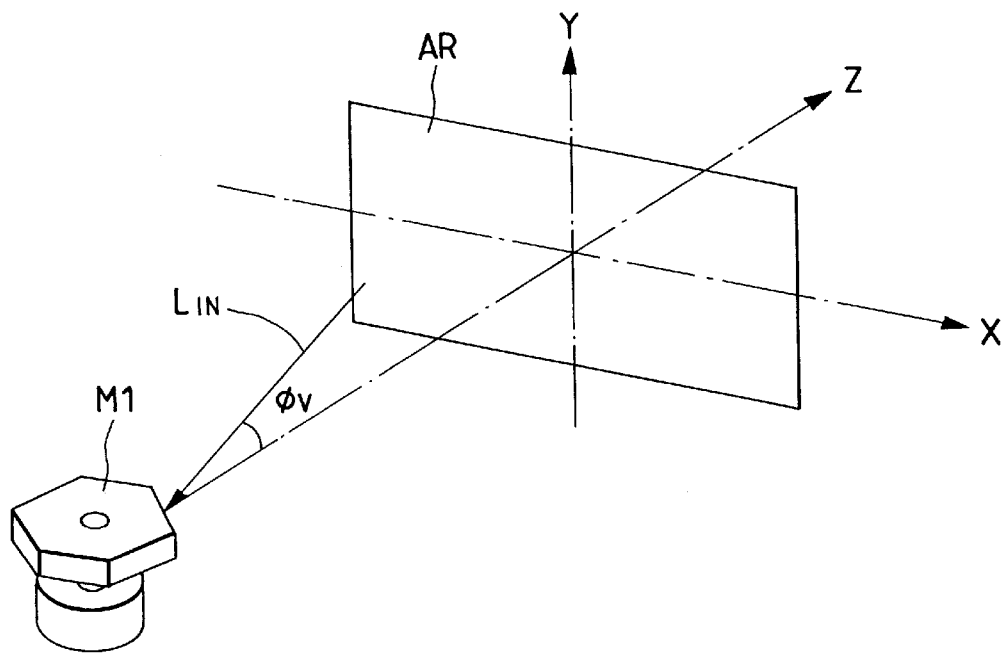
FIG. 1 is a perspective view illustrating structural features of the present invention.
Figure 2:
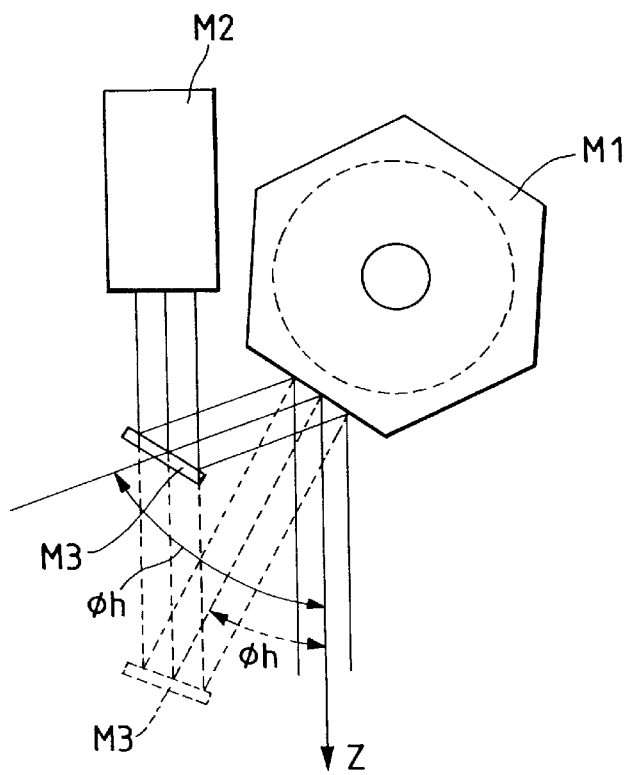
FIG. 2 is a plane view showing the structural features of the present invention.

Preferred embodiments of the present invention will be explained hereinafter with reference to accompanied drawings. Identical parts are denoted by the same reference numerals throughout the drawings.

First embodiment

Figure 4:
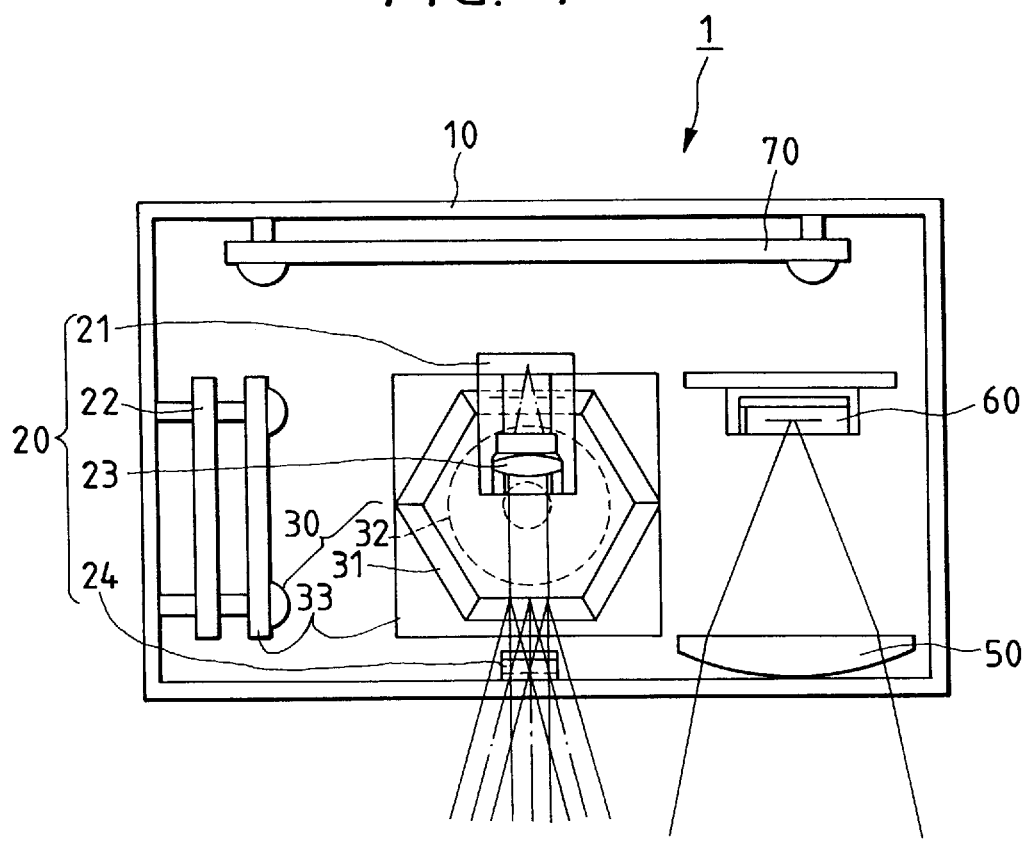
FIG. 4 is a plan view showing an arrangement of a radar apparatus in accordance with a first embodiment of the present invention.

A first embodiment of the present invention will be explained with reference to FIG. 4. A radar apparatus 1 comprises a housing 10 which accommodates a beam emitting section 20 generating beamed radio-frequency energy, a beam reflecting section 30 reflecting a thus-generated transmission beam toward a predetermined direction, a lens 50 and a light receiving element 60 cooperatively receiving reflected radio-frequency energy (i.e., the transmission beam returned from an object), and a calculating circuit board 70 detecting or measuring distance, angle and relative speed of the detected object.

The beam emitting section 20 comprises a semiconductor laser diode 21, a circuit board 22 having an actuation circuit for the semiconductor laser diode 21, a collimator lens 23, and a mirror 24. The semiconductor laser diode 21, when activated by the actuation circuit of the circuit board 22, emits infrared pulse light. The infrared pulse light, emitted in this manner, is converted into a parallel beam after passing through the collimator lens 23 which is, for example, made of a resin. Regarding a means for converting light into a beam (i.e., a beam forming device), it will be possible to use a slit device instead of collimator lens 23.

The transmission beam is then reflected by the mirror 24 and advances toward the beam reflecting section 30. Preferably, the beam forming device, such as collimator lens 23 or its equivalent, is disposed between the semiconductor laser diode 21 and the beam reflecting section 30. Disposing the beam forming device closely to the semiconductor laser diode 21 is advantageous in reducing the size of a beam diameter. With this arrangement, the collimator lens 23 or its equivalent means can be downsized. This leads to the reduction of the size of a mirror surface of a polygon mirror 31, serving as a component of the beam reflecting section 30. Thus, the polygon mirror 31 itself can be also downsized.

The beam reflecting section 30 comprises, besides the polygon mirror 31, a polygon scanner motor 32 and a circuit board 33 mounting a driving circuit for the polygon scanner motor 32, both of which are disposed under the polygon mirror 31. The polygon scanner motor 32 is, for example, a stepping motor or a DC motor which is driven by the driving circuit of the circuit board 33. The polygon mirror 31 is associated with the polygon scanner motor 32, and has a body made of a resin and an outer flush surface coated by aluminum deposition. The polygon mirror 31 is rotated at a constant speed by the polygon scanner motor 32. The polygon mirror 31 may be an aluminum cutting or machined product.

Figure 5:
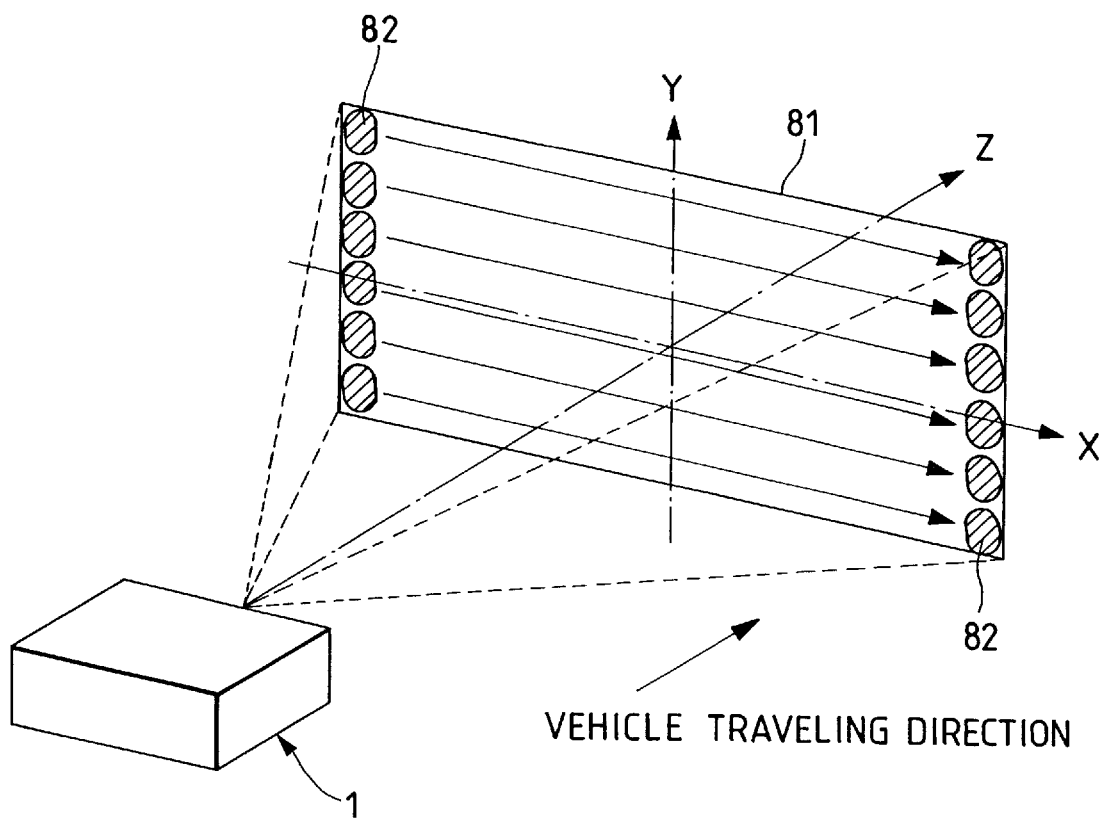
FIG. 5 is a perspective view illustrating a scanning pattern of the radar apparatus in accordance with the first embodiment of the present invention.

The polygon mirror 31 has a plurality of mirror surfaces (i.e., an outer flush surface), each having a different inclination with respect to the rotational axis of polygon mirror 31. The polygon mirror 31 is disposed in a predetermined positional relationship to the beam emitting section 20 so that the pulse beam emitted from the beam emitting section 20 is irradiated to the altitudinal center of each mirror surface of polygon mirror 31. The direction of the beam reflected from the mirror surface of polygon mirror 31 can be changed by rotating the polygon mirror 31 about its axis, thereby performing a horizontal scanning operation in the right-and-left direction. Every time the pulse beam is irradiated to a different mirror surface, the horizontal scanning operation is repeated from the left to the right at a different altitudinal level proportional to the inclination angle of each mirror surface. As shown in FIG. 5, a transmission beam pattern 82 scans a predetermined measuring area 81 (or within a predetermined scanning angular zone) in the right-and-left direction (i.e., X-direction). This scanning operation is repeated at different levels of the altitudinal direction (i.e., Y-direction), thereby accomplishing a two-dimensional scanning operation.

The transmission beam pattern 82 shown in FIG. 5 is a circular one; however, it may be a different shape, such as an elliptic or rectangular one. Preferably, adjacent emitted patterns 82 are slightly overlapped in both of the horizontal and altitudinal directions. To realize such desirable beam emissions, the emitting interval of the pulse beam is accurately controlled by the actuation circuit of semiconductor laser diode 21.

Next, an effect of the two-dimensional scanning operation shown in FIG. 5 will be explained. First, it is assumed that a vehicle equipped with this radar apparatus 1 is traveling on an ascending or descending road. Considering the possibility that the position of a preceding vehicle is changed largely or frequently in the altitudinal direction when vehicles are traveling on the ascending or descending road, it is preferable that measurements in the altitudinal direction are increased by adjusting the emitting intervals of the infrared pulse beam emitted from semiconductor laser diode 21. To this end, the actuation circuit of the semiconductor laser diode 21, provided in the circuit board 22, changes the emitting intervals of the infrared pulse beam in accordance with a pitch angle sent from a pitch angle sensor (not shown) incorporated in the circuit board 22.

For example, when the vehicle is traveling on an ascending-road, the position of a preceding vehicle will be higher than its own altitudinal level. Thus, increasing the measurements at higher altitudinal levels is preferable to eliminate the failure in the detection of preceding vehicles. In this manner, the two-dimensional scanning operation using a polygon mirror with a plurality of mirror surfaces inclined at different angles is advantageous in that only one actuation section is required and this leads to a downsizing of the scanning apparatus and an improvement of measuring reliability.

The pulse beam, reflected by the polygon mirror 31, advances toward a measuring object, such as a preceding vehicle. Then, the pulse beam is reflected at a reflector or the like of the preceding vehicle (i.e., at part of the measuring object). Part of the reflected beam returns to the radar apparatus 1 and passes through the lens 50 and is received by the light receiving element 60 disposed at or in the vicinity of the focal point of the light receiving lens 50.

The calculating circuit board 70, comprising a calculation circuit, is connected to the light receiving element 60 and also to the circuit board 22 which comprises the actuation circuit of the semiconductor laser diode 21. The calculation circuit obtains distance, angle and relative speed of the detected preceding vehicle (i.e., measuring object) based on the time (interval) between transmission of the pulse beam and reception of the reflected beam.

Next, the beam reflecting section 30, specifically polygon mirror 31 with a plurality of mirror surfaces inclined at different angles, will be explained in greater detail.

Figure 6A:
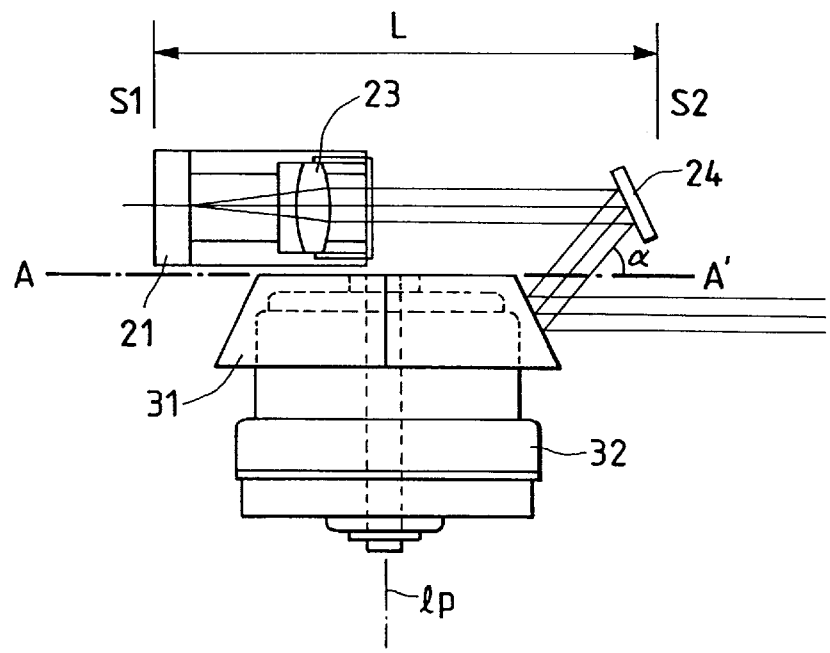
FIG. 6A is a side view showing an arrangement of a beam emitting section of the radar apparatus in accordance with the first embodiment of the present invention.
Figure 6B:
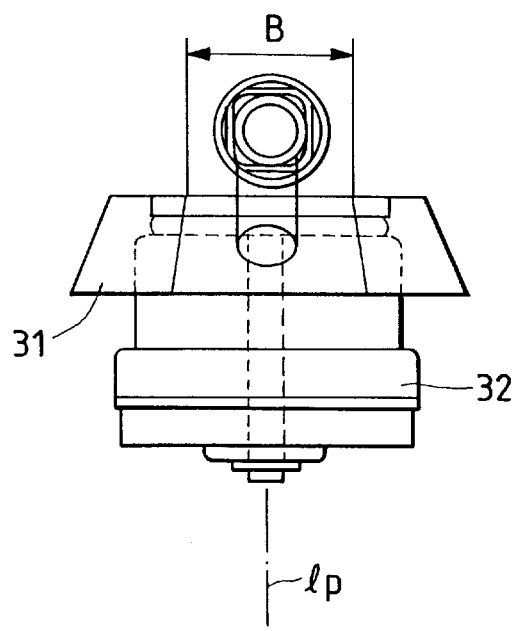
FIG. 6B is a front view showing the arrangement of the beam emitting section of the radar apparatus in accordance with the first embodiment of the present invention.

FIG. 6A is a side view and FIG. 6B is a front view, respectively showing the beam reflecting section 30 of the radar apparatus 1 in accordance with the first embodiment of the present invention.

An infrared pulse beam is emitted from semiconductor laser diode 21 and is converted into a parallel beam by collimator lens 23. The parallel beam is reflected by a mirror 24 and advances toward the polygon mirror 31. The polygon mirror 31 has an upper surface normal to the rotational axis "lp" of the polygon mirror 31. More specifically, the parallel beam advances at an angle α with respect to the upper surface, i.e., a plane A—A' normal to the rotational axis (i.e., "lp") of the polygon scanner motor 32, as shown in FIG. 6A. The polygon mirror 31 has a total of six mirror surfaces. However, the number of mirror surfaces, rotational direction, and inclination angles can be varied flexibly.

Using the arrangement of the above-described first embodiment makes it possible to solve the following problems.

In a scanning system using a polygon mirror to irradiate a laser beam at a constant angular pitch within a predetermined scanning zone, the value of this angular pitch is generally reduced when the resolution in the scanning angular direction needs to be improved under the condition that the scanning frequency is unchanged. However, reducing the angular pitch is not preferable in that the data processing time may become insufficiently short for accomplishing data processing in response to every reception of the beam.

Furthermore, in the laser diode emitting a laser beam, its maximum emitting frequency may be increased to such an extent that a laser power of satisfactory level cannot be obtained.

Figure 7:
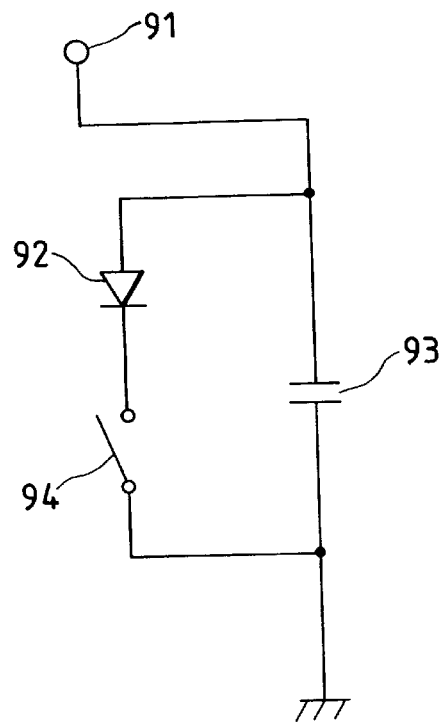
FIG. 7 is a circuit diagram showing a light emitting circuit for the radar apparatus in accordance with the first embodiment of the present invention.

These problems will be explained in more detail with reference to a light emitting circuit shown in FIG. 7. This light emitting circuit comprises a capacitor 93 which is connected to a power source unit 91 and stores charges when a voltage is applied from the power source unit 91. The light emitting circuit further comprises a laser diode 92 connected in parallel with the capacitor 93. A switching element 94 is connected in series with the laser diode 92 and has a function of on-and-off controlling actuation of this laser diode 92 in response to a command fed at a predetermined timing from an ECU (i.e., electrical control unit, which is not shown in the drawing). When the switching element 94 is closed, a discharge current flows instantaneously through the laser diode 92 from the capacitor 83 and, therefore, the laser diode 92 emits light for a short period of time during a discharging operation of capacitor 93. The switching element 94 is changed to an open position in accordance with the command fed from the ECU and, then, the capacitor 94 starts a recharging operation for storing charges supplied from the power source unit 91.

In such a light emitting circuit, if it is required to reduce the emitting interval, the switching element 94 will be forced to close the circuit before the capacitor 93 is sufficiently charged. This apparently produces a laser beam having an insufficient power. Thus, increasing the maximum emitting frequency of laser diode 92 is not a desirable method for improving the resolution in the scanning angular direction.

In this respect, irradiating the pulse beam from the upper direction of polygon mirror 31 at a sufficient angle φv=α as shown in FIG. 6A is advantageous in that a horizontal scanning angular zone (referred to as "lateral scan area," hereinafter) can be narrowed when compared with a comparative arrangement of FIG. 13 according to which a transmission beam is irradiated to a mirror surface of a polygon mirror having no gradient with respect to the plane normal to the rotational axis of the polygon mirror, under the condition that the number of repetitive light emissions and the maximum emitting frequency are unchanged in the above comparison. In other words, the arrangement shown in FIG. 6A makes it possible to improve the resolution in the scanning angular direction, without changing the emitting intervals (i.e., without inviting the lack of laser power).

This phenomenon will be explained in greater detail with reference to an exemplary calculation of the lateral scanning area.

Figure 8:
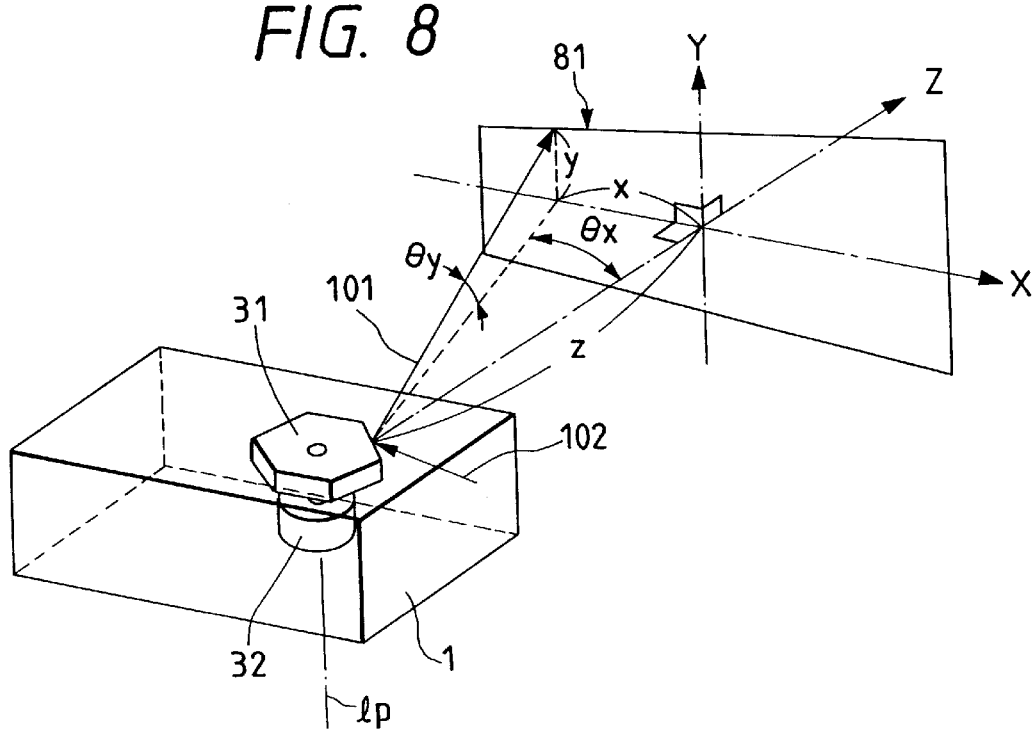
FIG. 8 is a perspective view showing a mechanism of the radar apparatus in accordance with the first embodiment of the present invention.

FIG. 8 illustrates a definition of the coordinate system used in this embodiment.

In FIG. 8, Z axis is defined as extending along a line connecting the beam reflecting point on a mirror surface of polygon mirror 31 and the center of the measuring area 81. When the radar apparatus 1 is mounted on a vehicle, the Z-axis direction is identical with a vehicle traveling direction. X axis is defined as extending along a line normal to the Z axis and parallel to the road surface, and Y axis is defined as extending along a line normal to both of the Z and X axes. Thus, Y axis is parallel to the rotational axis "lp" of polygon mirror 31.

In FIG. 8, an angle θy is a vertical scanning angle which is defined between the transmission beam 101 reflected by polygon mirror 31 and the XZ plane substantially parallel to the road surface. An angle θx is a lateral scanning angle which is defined between a projection line of transmission beam 101 projected on the XZ plane and the Z axis. Calculating both of the vertical scanning angle θy and lateral scanning angle θx makes it possible to obtain the vertical scanning area and the lateral scanning area of the measuring area 81.

Figure 9A:
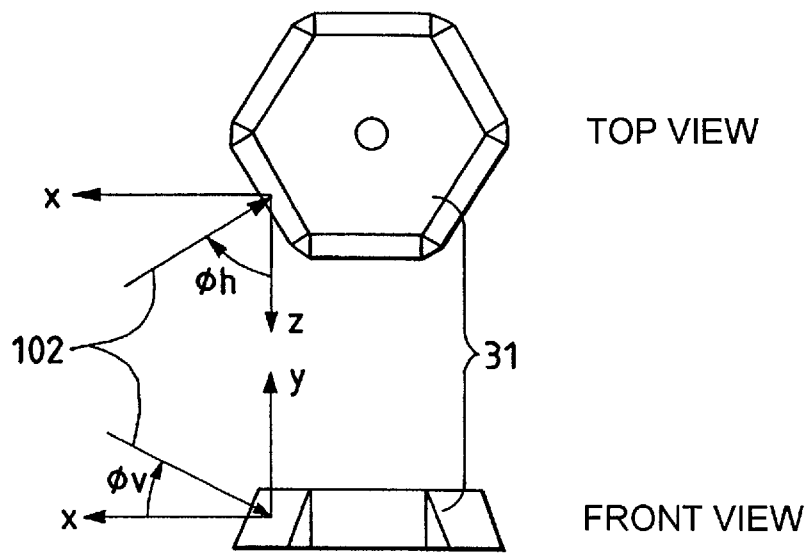
FIGS. 9A and 9B are views showing detailed features of the radar apparatus in accordance with the first embodiment of the present invention.

FIG. 9A shows an angular relationship between the incident beam 102 and polygon mirror 31. In FIG. 9A, an angle φh is a lateral incident angle that is defined between the Z axis and a projection line of incident beam 102 projected on the XZ plane. An angle φv is a vertical incident angle that is defined between the incident beam 102 itself and the XZ plane.

Figure 9B:
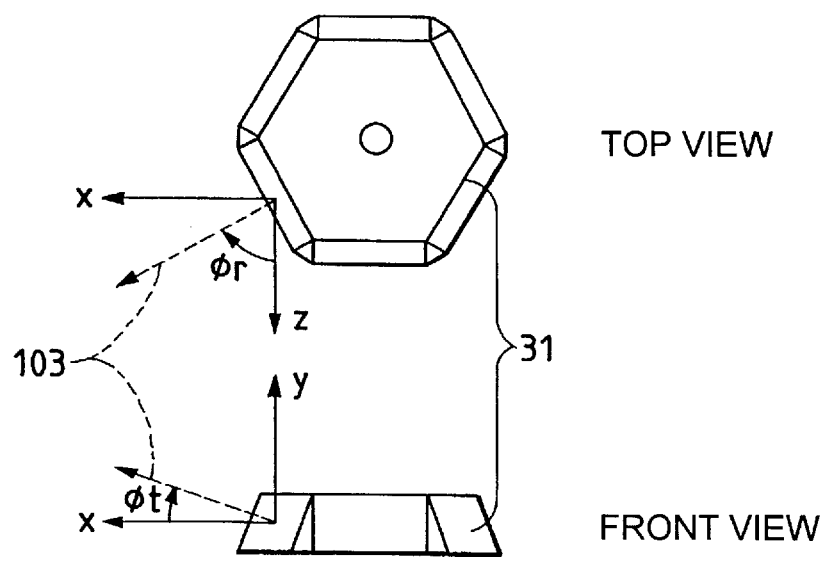

FIG. 9B shows an angular relationship between polygon mirror 31 and its mirror normal. In FIG. 9B, an angle φr is a mirror rotational angle that is defined between the Z axis and a projection line of mirror normal 103 projected on the Xz plane. An angle φt is an inclination angle that is defined between the mirror normal 103 itself and the XZ plane.

The lateral scanning angle θx and the vertical scanning angle θy are expressed by the following equations using the above four-parameters φh, φv, φr and φt defined in FIGS. 9A and 9B.

$$\theta x = \tan^{-1}(x/z) \tag{1}$$

$$\theta y = \tan^{-1}(y/z) \cdot \cos \theta x \tag{2}$$

A projection plane is defined as a plane normal to the Z axis and crossing the Z axis at an arbitrary point "z." In this case, coordinates (x, y) represent a crossing point of the transmission beam on the projection plane.

From the foregoing, the following relationship is established.

$$X = \cos\phi v \cdot \cos 2\phi t \cdot \sin \phi r \cdot \cos(\phi r - \phi h) + \sin\phi v \cdot \sin 2\phi t \cdot \sin \phi r + \cos\phi v \cdot \cos\phi r \cdot \sin(\phi r - \phi h) \quad (3)$$

$$Y = \cos\phi v \cdot \sin 2\phi t \cdot \cos(\phi r - \phi h) - \sin\phi v \cdot \cos 2\phi t \quad (4)$$

$$Z = \cos\phi v \cdot \cos 2\phi t \cdot \sin \phi r \cdot \cos(\phi r - \phi h) + \sin\phi v \cdot \sin 2\phi t \cdot \cos\phi r - \cos\phi v \cdot \sin(\phi r - \phi h) \quad (5)$$

Thus, a calculation using the above equations (1) through (5) obtains the vertical scanning area and the lateral scanning area of the measuring area 81.

Figure 10A:
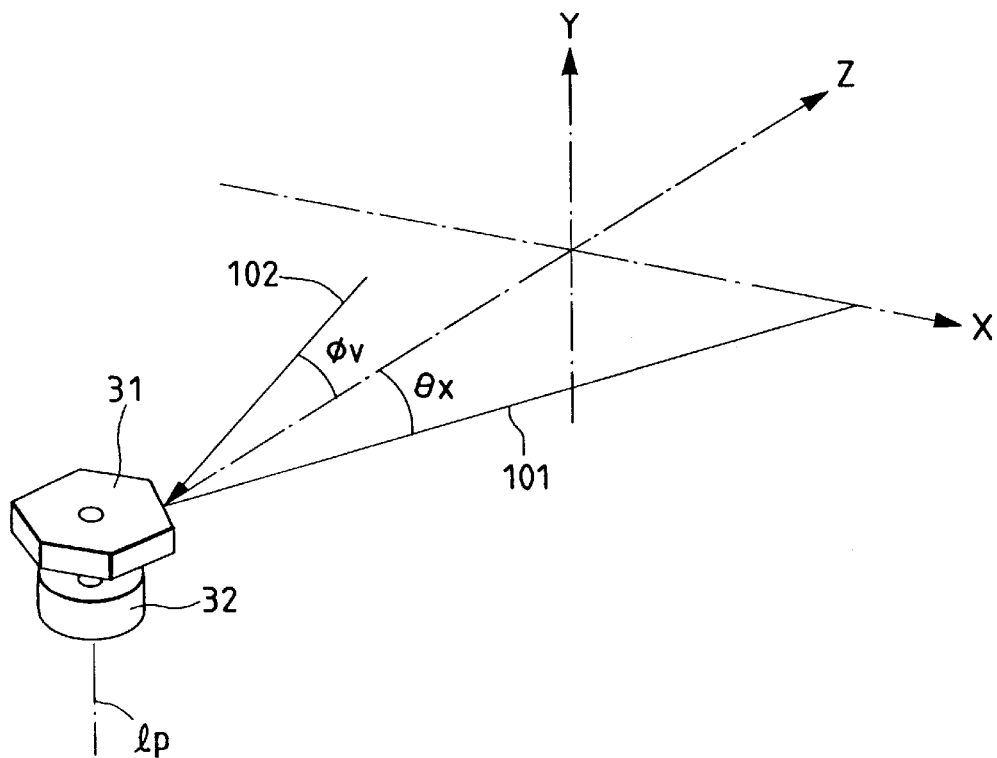
FIGS. 10A and 10B are perspective views showing detailed features of the radar apparatus in accordance with the first embodiment of the present invention.
Figure 10B:
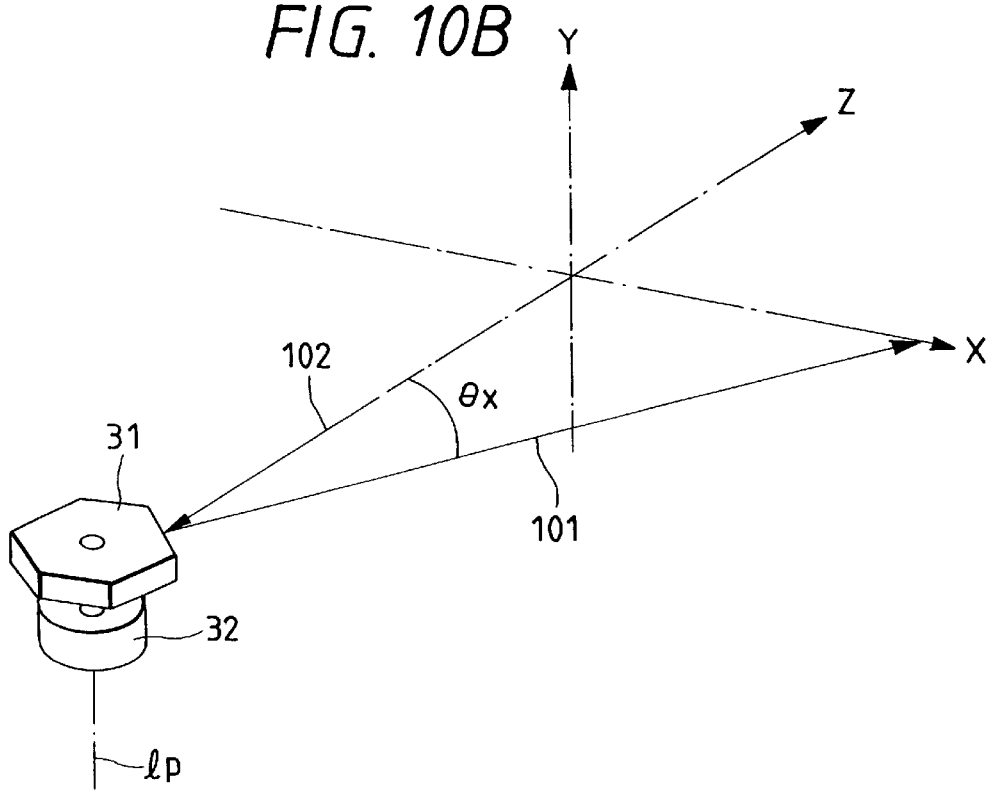

FIG. 10A shows a condition where the incident beam 102 enters at a significant vertical incident angle $\phi v$ with respect to the XZ plane normal to the rotational axis "lp" of the polygon mirror 31. FIG. 10B shows a condition where the incident beam 102 enters with no gradient (i.e., vertical incident angle $\phi v=0$) with respect to the XZ plane. For comparison, the lateral scanning area in the measuring area will be explained. In this comparison, vertical scanning angle $\theta y$ of transmission beam 101 is zero. In other words, transmission beam 101 scans the given measuring area along the X axis. A comparison is done by rotating the polygon mirror 31 by the same angle to compare the scanning angle in the right-and-left direction.

First, the scanning angle for FIG. 10A will be explained.

As shown in FIG. 10A, incident beam 102 enters at vertical incident angle $\phi v$ with respect to the plane normal to the rotational axis "lp" of polygon mirror 31 (i.e., XZ plane). A practical value for vertical incident angle $\phi v$ is 48°. For simplification, lateral incident angle $\phi h$ is set to zero. Here, mirror inclination angle $\phi t$ becomes 24° that is unequivocally obtained from the premise that $\theta y=0°$ and $\phi v=48°$.

When the polygon mirror 31 is rotated within an angular zone of ±5° with respect to the Z axis (i.e., mirror rotational angle $\phi r=5°$), the lateral scanning angle $\theta x$ is obtained in the following manner. Namely, based on the above settings of $\phi v=48°$, $\phi h=0°$, $\phi t=24°$ and $\phi r=5°$, the lateral scanning angle $\theta x$ becomes approximately 8.34° from a calculation using the above equations (1), (3) and (5).

Next, the scanning angle for FIG. 10B will be explained.

As shown in FIG. 10B, incident beam 102 enters along the Z axis and reaches the mirror surface of the polygon mirror having no gradient ($\phi v=0$) with respect to the plane normal to the rotational axis "lp" of polygon mirror 31. Here, for simplification, and in the same manner as in the above case, lateral incident angle $\phi h$ is set to zero. Here, mirror inclination angle $\theta t$ becomes zero from the settings of $\theta y=0°$ and $\phi v=0°$.

The lateral scanning angle $\theta x$ for the mirror rotational angle $\theta r=5°$ is obtained from a calculation using the equations (1), (3) and (5). Namely, based on the above settings of $\phi v=0°$, $\phi h=0°$, $\phi t=0°$ and $\phi r=5°$, the lateral scanning angle $\theta x$ becomes approximately 10°.

From the above description, it is apparent that the lateral scanning angle Ox becomes small with increasing vertical incident angle $\phi v$, i.e., an angle between the incident beam 102 and the XZ plane normal to the rotational axis "lp" of polygon mirror 31. On the contrary, when the lateral scanning angle $\theta x$ is fixed to a predetermined value, the mirror rotational angle $\phi r$ is reversely obtained from a calculation using the equations (1), (3) and (5). For example, in FIG. 10A, the mirror rotational angle $\phi r$ for obtaining lateral scanning angle $\theta x=±10°$ becomes ±6° that is larger than ±5° of the case shown in FIG. 10B.

In short, when the vertical incident angle $\phi v$ becomes large, it is generally required to enlarge the mirror rotational angle to secure a predetermined lateral scanning area.

Next, a relationship between the mirror rotational angle and the maximum emitting frequency of the laser diode will be explained.

Figure 11A:
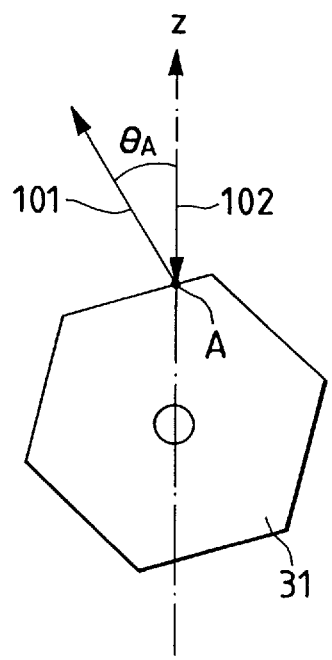
FIGS. 11A and 11B are plan views showing detailed features of the radar apparatus in accordance with the first embodiment of the present invention.
Figure 11B:
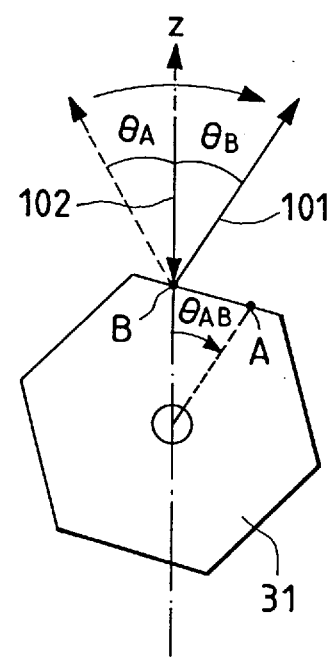

First, as shown in FIG. 11A, it is assumed that the incident beam comes along the Z axis and reaches a point "A" on a mirror surface of polygon mirror 31 and is reflected as transmission beam 101 to the left side of the Z axis at an angle $\theta A$. Next, as shown in FIG. 11B, a scanning angle of transmission beam 101 is set to cover a zone extending in a clockwise direction until it reaches a point corresponding to angle $\theta B$ at the right side of the Z axis. This is realized by rotating the polygon mirror 31 about its rotational axis "lp" in the clockwise direction by an amount $\theta_{AB}$.

For example, the total number of emissions of the laser diode required to realize $\theta_A = \theta_B = 10°$ is 100 per mirror surface, when the angular pitch is set to 0.2° to divide the lateral scanning area into 100 subsections. The maximum emitting frequency of the laser diode is determined based on the total number of emissions, mirror rotational angle $\theta_{AB}$, and the rotational speed of polygon mirror 31.

For example, in the above-explained case where the incident beam 102 enters with no gradient with respect to the XZ plane normal to the rotational axis "lp" of polygon mirror 31 (i.e., $\theta v=0°$), the maximum emitting frequency of the laser diode is obtained in the following manner.

When the lateral scanning area is ±10°, a required mirror rotational angle is ±5° (i.e., $\theta_{AB}=10°$). When the rotational speed of polygon mirror 31 is, for example, 600 rpm, the maximum emitting frequency fmax of the laser diode is obtained from the following equation (6).

$$fmax = (V/60) \times (360°/\theta_{AB}) \times Ph \quad (6)$$

=36 kHz where fmax:maximum emitting frequency [Hz], V: motor rotational speed [rpm] $\theta_{AB}$:mirror rotational angle [°]Ph:number of divided subsections in the lateral scanning area On the other hand, in the other case where the incident beam 102 enters at an incident angle of 48° with respect to the XZ plane normal to the rotational axis "lp" of polygon mirror 31 (i.e., $\phi v=48°$), the maximum emitting frequency of the laser diode is obtained in the following manner.

Under the same settings that the lateral scanning area is ±10° and the rotational speed of polygon mirror 31 is 600 rpm, a required mirror rotational angle becomes ±6° (i.e., $\theta_{AB}=12°$) and the maximum emitting frequency fmax of the laser diode becomes fmax =30 kHz from the equation (6).

Next, variation of the maximum emitting frequency will be explained with reference to a time chart.

According to the arrangement above described, the polygon mirror 31 has a total of six mirror surfaces inclined at different angles. Thus, the measuring area 81 consists of six separated zones in the up-and-down direction as shown in FIG. 5. The measuring area 81 is scanned entirely during a complete rotation (360°) of the polygon mirror 31.

Figure 12:
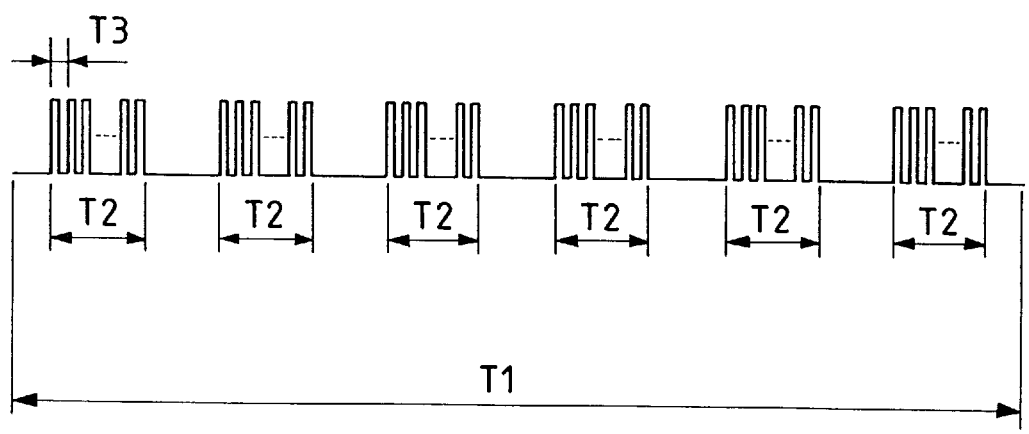
FIG. 12 is a time chart showing pulse beam emissions of the radar apparatus in accordance with the first embodiment of the present invention.

FIG. 12 is a time chart showing the emission timing of the laser diode in this case. As shown in FIG. 12, during a time interval T1 for one complete rotation of polygon mirror 31, the laser diode causes a total of six consecutive emissions corresponding to six mirror surfaces of polygon mirror 31, each continuing during a time interval T2. This time interval T2 corresponds to the mirror rotational angle $\theta_{AB}$. In FIG. 12, time T3 represents a time interval of emissions of the laser diode. T3 is determined from the lateral scanning angular area and the number of its divided subsections. In other words, T3 is a reciprocal of the maximum emitting frequency.

Using this time chart, the previous examples will be explained again. In the case where the incident beam arrives at 0° with respect to the plane normal to the rotational axis "lp" of polygon mirror 31, the maximum emitting frequency is 36 kHz. Therefore, T3 becomes approximately 28 $\mu$sec. On the other hand, in the case where the incident beam arrives at 48° with respect to the plane normal to the rotational axis "lp" of polygon mirror 31, the maximum emitting frequency is 30 kHz. Therefore, T3 becomes approximately 33 $\mu$sec. Thus, the emitting interval can be enlarged by approximately 20%.

From the foregoing description, it is apparent that the maximum emitting frequency can be enlarged with increasing vertical incident angle $\phi v$, i.e., an angle between the incident beam and the plane normal to the rotational axis "lp" of polygon mirror 31. Accordingly, the arrangement of this embodiment makes it possible to enlarge the emitting interval of the laser diode. This is advantageous in that the data processing time can be elongated sufficiently.

Furthermore, even if the angular pitch is significantly reduced to improve the resolution in the scanning angular direction, the laser power of the transmission beam can be maintained at a satisfactory level. As explained previously, when the maximum emitting frequency is increased, the charging time of the capacitor is reduced contradictorily. Therefore, the increase of the maximum emitting frequency possibly forces the capacitor to discharge its energy before it is sufficiently charged. This results in an emission of a transmission beam lacking laser power. However, the arrangement of this embodiment can decrease the maximum emitting frequency so as to increase the charging time of the capacitor. Thus, it becomes possible to surely emit a transmission beam with a satisfactory level of laser power.

Another effect of the arrangement of the first embodiment will be explained.

Figure 13:
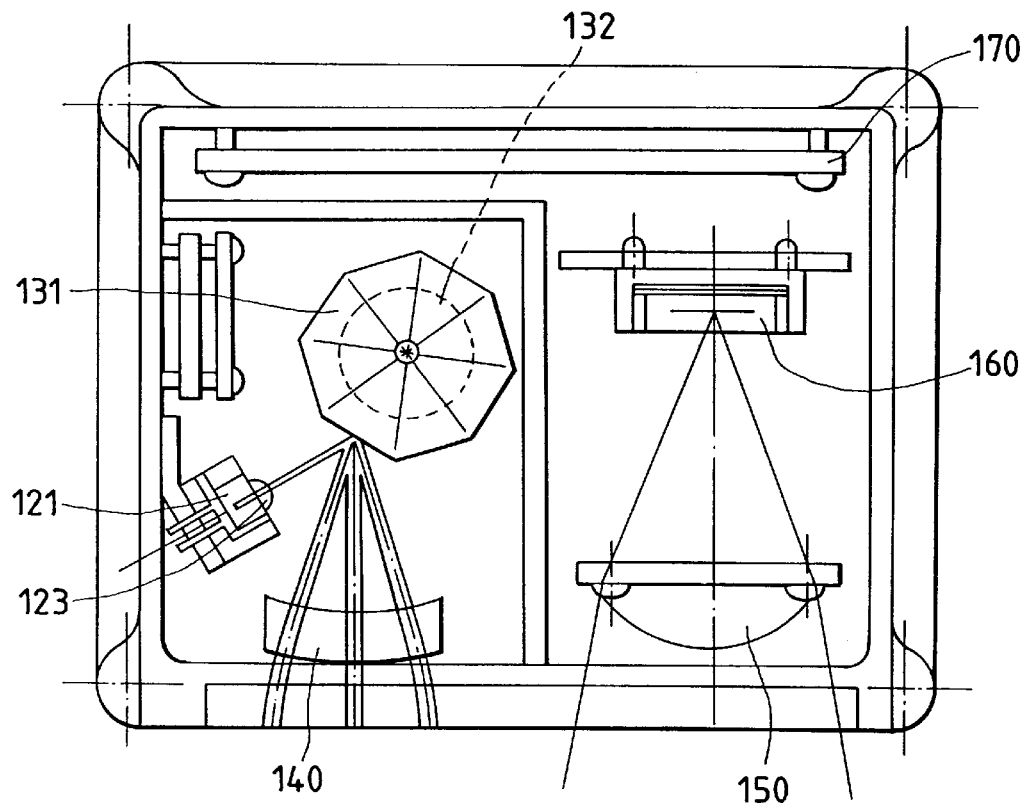
FIG. 13 is a plan view showing a comparative radar apparatus.

For comparison, FIG. 13 shows a radar apparatus comprising a polygon mirror 131 with mirror surfaces inclined at different angles and a semiconductor laser diode 121 disposed at an oblique front of polygon mirror 131. The semiconductor laser diode 121 emits an infrared pulse beam in a direction parallel to the plane normal to the rotational axis "lp" of polygon mirror 131, so as to perform a two-dimensional scanning operation. In FIG. 13, reference numeral 123 represents a collimator lens, reference numeral 132 represents a polygon scanner motor, reference numeral 140 represents a transmission lens, reference numeral 150 represents a reception lens, reference numeral 160 represents a light receiving element, and reference numeral 170 represents a calculating circuit board.

Figure 14:
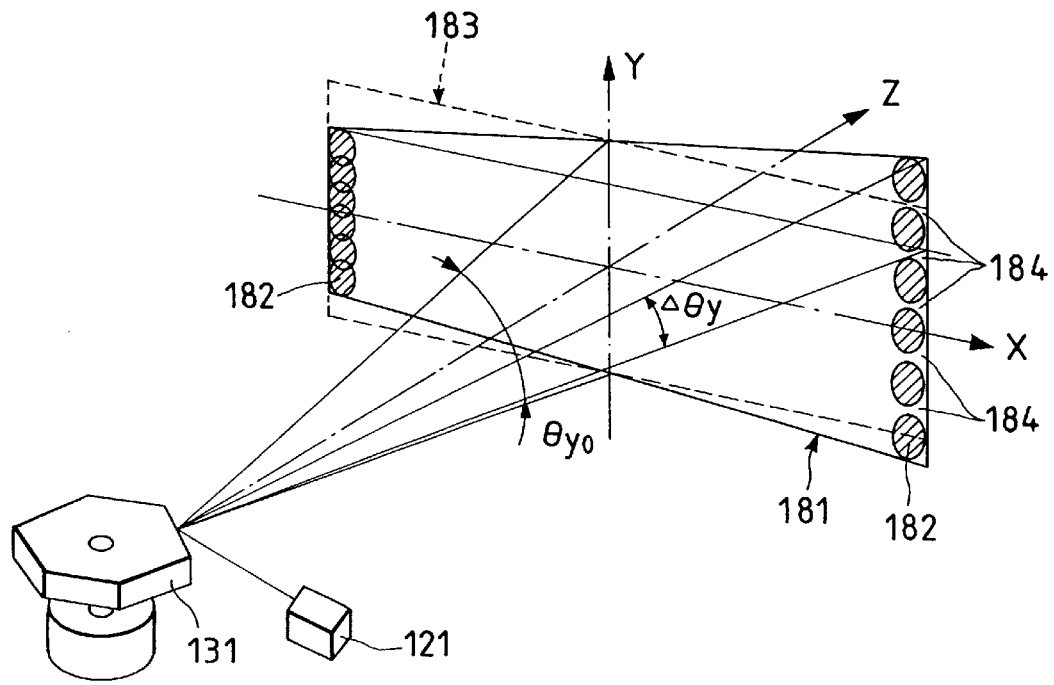
FIG. 14 is a perspective view showing a measuring area of the comparative radar apparatus.

FIG. 14 shows a measuring area 181 that is obtained from the above-described equations (1) through (5). As apparent from FIG. 14, vertical scanning angle $\theta y$ becomes larger at the right (+) side of the X axis than at the left (−) side of the X axis. Thus, according to the arrangement of this comparative example, the scanning area is distorted in the vertical direction. The actual shape of the resultant measuring area 181 becomes a trapezoid. To show the difference, a dotted line is an optimum measuring area 183 that is a right rectangle.

The distorted measuring area 181 shown in FIG. 14 is disadvantageous in that a significant amount of gap 184 (i.e., insensible zone) is generated between adjacent transmission beams 182 and 182 at the right side. If a reflecting portion of a measuring object, such as a reflector of a vehicle, is located in this gap, a measuring of the object will be fail. To eliminate this kind of undesirable gap 184, it will be possible to narrow the vertical scanning angle $\theta y$. However, this is not desirable because then the vertical scanning angle $\theta y$ is excessively narrowed at the left side. As another method for eliminating these gaps, it will be possible to expand the beam angle of the transmission beam. However, this method is also disadvantageous in that the power density of the laser beam is reduced with reduction of a reachable distance of the transmission beam. In addition, right-and-left differences in the size of transmission beam pattern and power density will cause dispersion in the detectable distance. In this manner, the distorted measuring area invites many and serious problems.

To reduce such undesirable distortions of the measuring area in the vertical direction, it is effective to reduce the lateral incident angle $\phi h$, as apparent from the above-described equations (1) through (5).

The distortion of the measuring area can be quantized in the following manner.

In FIG. 14, $\Delta\theta y$ represents a difference of vertical scanning angle $\theta y$ between right and left edges of the distorted measuring area 181, while $\theta y 0$ represents the vertical scanning angle at the lateral center of the measuring area 181. A ratio of $\Delta\theta y$ to $\theta y 0$ is defined as a vertical distortion factor $\epsilon y$.

$$\epsilon y = (\Delta\theta y / \theta y 0) \times 100 [\%] \qquad (7)$$

Figure 15:
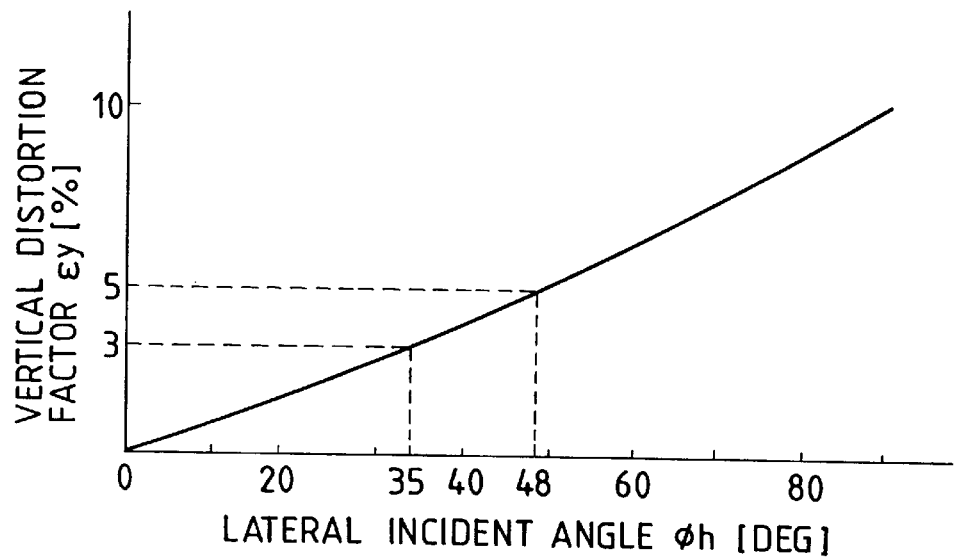
FIG. 15 is a graph showing a relationship between lateral incident angle φh and vertical distortion factor εy in the radar apparatus in accordance with the first embodiment of the present invention.

FIG. 15 shows a calculation result of vertical distortion factor $\epsilon y$, i.e., a relationship between the lateral incident angle $\phi h$ and the distortion of measuring area 181. As apparent from FIG. 15, the vertical distortion factor $\epsilon y$ decreases with reducing lateral incident angle $\phi h$. At the smallest vertical distortion factor (i.e., $\phi h = 0$), the vertical distortion factor $\epsilon y$ is 0. The measuring area 181 becomes a regular rectangle in this case. For a larger vertical distortion factor, the shape of measuring area 181 is a trapezoid as shown in FIG. 14.

As a practical zone, it is experimentally confirmed that there is no significant distortion when the vertical distortion factor $\epsilon y$ is not larger than 5%, preferably not larger than 3%. Accordingly, it is preferable that the lateral incident angle $\phi h$ is not larger than 48°, more preferably not larger than 35°. Furthermore, it is preferable that the lateral incident angle $\phi h$ is not larger than the maximum scanning angle in the X direction.

However, the arrangement of the comparative radar apparatus shown in FIG. 13 does not allow to reduce the lateral incident angle $\phi h$ because of interference between the reflection beam and the body of the semiconductor laser diode or its mounting board.

To the contrary, the arrangement of the first embodiment of the present invention allows to reduce the lateral incident angle $\phi h$ to zero without any interference, because the pulse beam is irradiated from the upper front of the polygon mirror 31. In other words, the first embodiment of the present invention makes it possible completely correct the distortion of the measuring area. Furthermore, the size of the laser emitting section can be reduced. Thus, the first embodiment of the present invention provides a compact radar apparatus.

Figure 16:
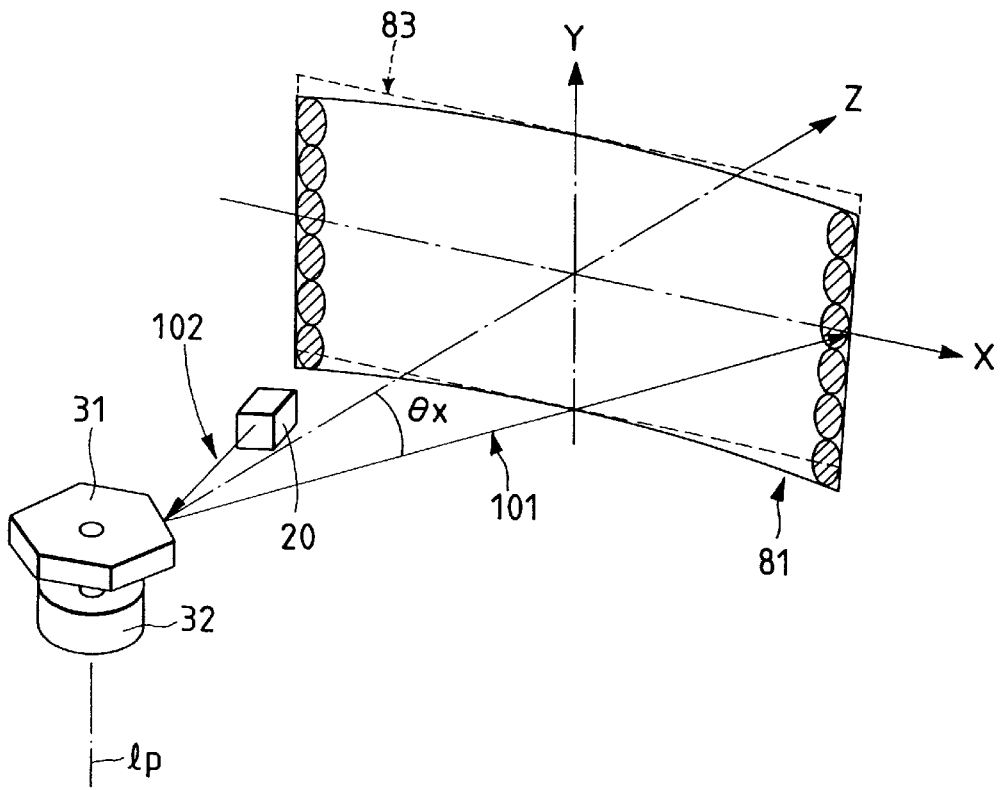
FIG. 16 is a perspective view showing a measuring area of the radar apparatus in accordance with the first embodiment of the present invention.

As shown in FIG. 16, due to the arrangement that the pulse beam is irradiated with lateral incident angle $\phi h = 0°$ and at a significant vertical incident angle φv with respect to the plane normal to the axis of the polygon mirror, the measuring area 81 realized by the first embodiment is completely symmetrical about the Y axis although the right and left edges are slightly distorted compared with optimum measuring area 83. However, this distortion is not so significant in view of the fact that the measuring area for ordinary radar apparatuses has a wide lateral angular zone (10°–20°) and a relatively narrow vertical angular zone (3°–4°). Furthermore, the vertical scanning area is constant at any scanning position. This is useful to eliminate undesirable gap 184 (i.e., insensible zone) explained with reference to FIG. 14.

Figure 17:
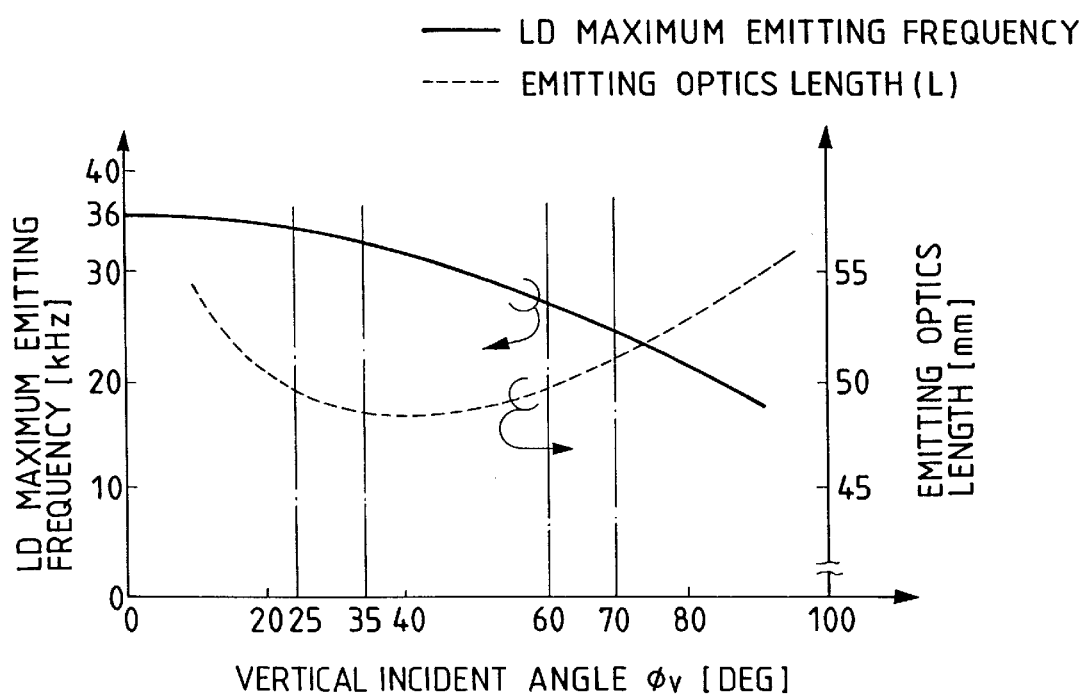
FIG. 17 is a graph showing a relationship between vertical incident angle φv, maximum emitting frequency of the laser diode, and emitting optics length in the radar apparatus in accordance with the first embodiment of the present invention.

Next, preferable values for the vertical incident angle φv will be explained. FIG. 17 shows a relationship between vertical incident angle φv and LD (laser diode) emitting frequency, or emitting optics length "L" (refer to FIG. A).

In FIG. 17, LD maximum emitting frequency is a maximum frequency of he laser beam emitted under the conditions that the motor rotational speed is 600 rpm, the lateral (right-and-left) measuring area is ±10°, and the emitting pitch is 0.2°. The LD maximum emitting frequency decreases with increasing vertical incident angle φv.

The emitting optics length "L" is a minimum horizontal length covering a region from the outermost (left) end "S1" of semiconductor diode 21 to the outermost (right) end "S2" of mirror 24 shown in FIG. 6A under the condition that the outer peripheral edge of polygon mirror 31 does not exceed the boundary "S1" and a distance between the semiconductor laser diode 21 and polygon mirror 31 is constant.

Figure 3:
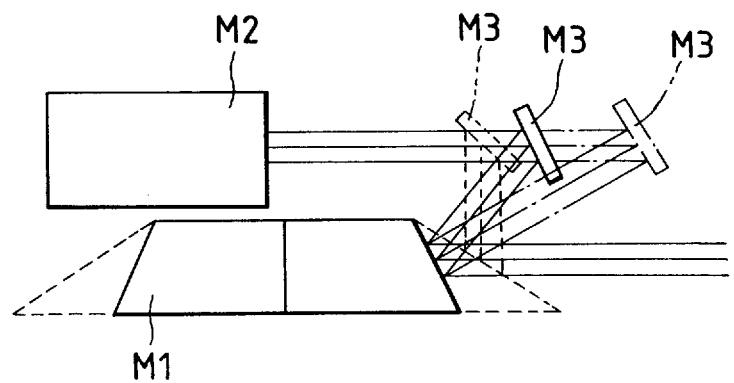
FIG. 3 is a side view showing the structural features of the present invention.

As explained with reference to FIG. 3, the position of mirror 24 needs to be shifted right when the vertical incident angle φv=α is reduced, since the semiconductor laser diode 21 and polygon mirror 31 are located in a stationary relationship. In other words, the emitting optics length "L" increases as reducing vertical incident angle φv is reduced.

Meanwhile, when the vertical incident angle φv becomes large, the inclination angle (φt) of polygon mirror 31 needs to be substantially increased largely. Increasing the inclination angle (φt) to secure a sufficient area for reflecting the transmission beam leads to increase of the outer diameter of polygon mirror 31, under the condition that the lateral width "B" of each mirror surface (refer to FIG. 6B) is unchanged. Thus, the emitting optics length "L" is increased.

Considering the LD maximum emitting frequency and the size of apparatus, it is derived from the relationship of FIG. 17 that an optimum range for vertical incident angle φv is φv=25°–70°, preferably φv=35°–60°.

As apparent from the foregoing description, the first embodiment of the present invention makes it possible to provide a compact radar apparatus having a measuring area symmetrical in the right-and-left direction and free from the occurrence of undesirable gaps between scanning lines in the measuring area.

Second embodiment

Next, a vehicle safe distance control system incorporating the radar apparatus of the present invention will be explained with reference to FIG. 18.

Figure 18:
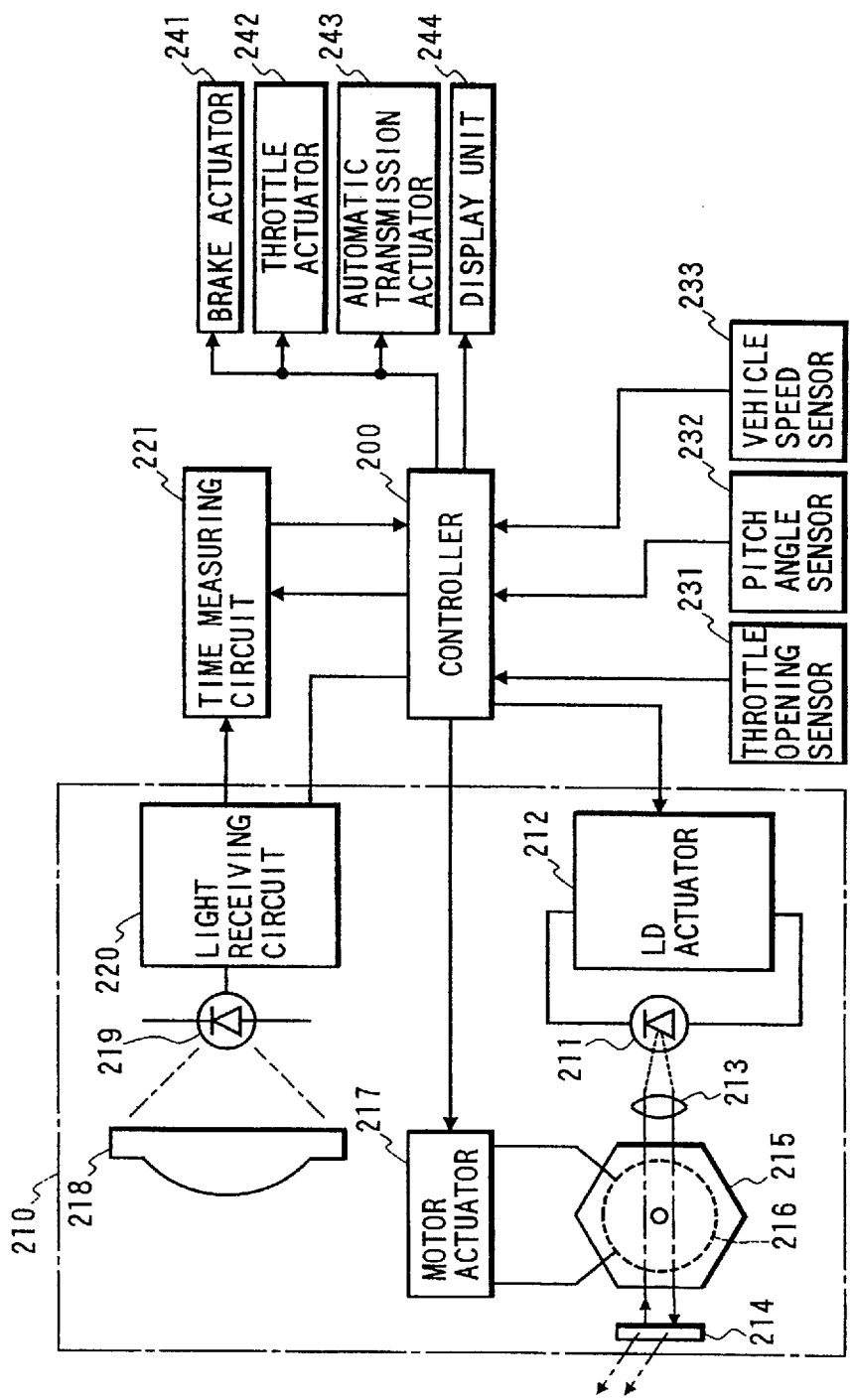
FIG. 18 is a schematic block diagram showing a vehicle safe distance control system in accordance with a second embodiment of the present invention.

As shown in FIG. 18, the vehicle safe distance control system of the second embodiment comprises a controller 200, a laser radar 210, a time measuring circuit 221, a throttle opening sensor 231, a pitch angle sensor 232, a vehicle speed sensor 233, a brake actuator 241, throttle actuator 242, an automatic transmission actuator 243, and a display unit 244.

Laser radar 210 comprises a laser diode (LD) 211, a laser diode actuator (LD actuator) 212, a collimator lens 213, a mirror 214, a polygon mirror 215, a polygon scanner motor 216, a motor actuator 217, a light receiving lens 218, a photo diode 219, and a light receiving circuit 220.

Mirror 214 is disposed at an upper front position of polygon mirror 215. More specifically, in the three-dimensional rectangular coordinates used in the first embodiment, the pulse beam is irradiated to the polygon mirror 215 with lateral incident angle φh=0° and vertical incident angle φv>0°.

The LD actuator 212 and motor actuator 217 are controlled by the controller 200. A detection signal of light receiving circuit 220 is sent directly to the controller 200. Meanwhile, the detection signal of light receiving circuit 220 is sent to time measuring circuit 221. The time measuring circuit 221 is connected to controller 200, so that the detection signal is sent to controller 200 via time measuring circuit 221.

Time measuring circuit 221 measures a time interval between transmission of an infrared beam (i.e., light emitting time of LD 211 entered from controller 200) and reception of a returned beam (i.e., light receiving time at light receiving circuit 220), thereby measuring a distance between the system-equipped vehicle and a preceding vehicle.

FIG. 19 is a flow chart showing an operation performed in the calculating section 200. First, in step S10, controller 200 sends an actuation signal to LD actuator 212 to cause LD 211 to emit light. Then, in step S20, controller 200 receives a detection signal from light receiving circuit 220. And, in step S30, controller 200 calculates a distance to an object detected. More specifically, the distance D [m] is obtained from the following equation.

$$D=(t1-t2)\cdot c/2 \qquad (8)$$

where t1 [sec] represents a light receiving time, t2 [sec] represents a light emitting time, and c [m/sec] represents the speed of light.

When no detection signal is entered, the processing of step S30 is not performed. The calculation results of step S30, i.e., distance data, are stored in RAM of controller 200.

The processing from step S10 to step S30 is repeated until a scanning operation equivalent to one line of the measuring area is completed. Namely, in step S40, controller 200 checks whether a one-line scanning operation is completed.

After the one-line scanning operation is finished, the controller checks in the next step S50 whether there is any distance data calculated through the operation of step S30. If there is no distance datum, the controller 200 returns to step S10. Otherwise, the controller 200 proceeds to the next step S60 to perform a grouping operation of a preceding object detected. This grouping operation is, for example, performed to know the position of the detected object on the measuring area and the distance from the system-equipped vehicle, or to check any variation in the relative position or relative distance of the detected object.

Next, in step S70, based on the result of such a grouping operation, the controller 200 makes a judgment as to whether the detected object is a vehicle (i.e., true obstacle) or others (e.g., traffic or road signs standing on the roadside). For example, there may be a possibility that a detected object is something approaching from an upper direction in a short distance under the condition where no ascending road is detected by the pitch angle sensor 232. In such a case, the controller 200 judges in the step S70 that the detected object is a footbridge or a road sign other than vehicles. However, when such an object is located far from the radar, the controller continues to monitor this object by checking the variations of the object in the relative distance and/or relative direction. In this manner, the controller 200 discriminates what the detected object is.

The processing from step S10 through S70 is repeated until the measuring area is entirely scanned. That is, in step S80, controller 200 judges whether there is any line to be scanned. Then, in the next step S90, controller 200 judges whether the scanning operation is completed for the entire measuring area.

When any preceding vehicle is detected, controller 200 sends various warning data to the display unit 244 and generates control signals to the brake actuator 241, throttle actuator 242 and automatic transmission actuator 243 to maintain a safe distance based on the detected distance (step S100).

The processing from step S10 through S40 is accomplished within the time period T3 (i.e., a light emitting interval of the pulse beam) shown in FIG. 12. The processing from step S10 through S80 is accomplished within the time period T2 (i.e., a time interval of consecutive emissions for each mirror surface) shown in FIG. 12. And, processing from step S10 through S100 is accomplished within the time period T1 (i.e., a time interval for one complete rotation of polygon mirror 31) shown in FIG. 12.

If the time period T3 is sufficiently long, the calculating processing can be surely accomplished within this period as explained in the first embodiment. Thus, to enlarge the time period T3, the vertical incident angle $\phi v$ is determined with reference to the relationship shown in FIG. 17.

According to the vehicle safe distance control system of the second embodiment the pulse beam is irradiated to the polygon mirror 215 in the same manner as in the first embodiment. Accordingly, it becomes possible to eliminate the occurrence of undesirable gaps between scanning lines in the measuring area. This is advantageous to eliminate failures in the obstacle detections.

As this invention may be embodied in several forms without departing from the spirit of essential characteristics thereof, the present embodiments as described are therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A radar apparatus comprising:
    a rotary polygon mirror with a plurality of mirror surfaces inclined at different angles with respect to a rotational axis of said rotary polygon mirror;
    pulse beam transmitting means for generating a transmission beam to a predetermined measuring area, said pulse beam transmitting means including a light source for emitting a pulse beam which is reflected by said rotary polygon mirror and converted into said transmission beam advancing toward said predetermined measuring area; and
    light receiving means for receiving the transmission beam returned from an object positioned within said measuring area,
    wherein, in a three-dimensional coordinate system defined by Y axis parallel to the rotational axis of said rotary polygon mirror, Z axis extending from said rotary polygon mirror to a center of said measuring area, and X axis normal to both of said Y axis and said Z axis, said pulse beam is irradiated to said mirror surfaces from a direction inclined at a predetermined angle with respect to an XZ plane in said three-dimensional coordinate system.

2. The radar apparatus in accordance with claim 1, wherein said pulse beam is irradiated to said mirror surfaces at an angle in a range of ±48° with respect to a YZ plane in said three-dimensional coordinate system.

3. The radar apparatus in accordance with claim 2, wherein said pulse beam is irradiated to said mirror surfaces at an angle in a range of ±35° with respect to the YZ plane in said three-dimensional coordinate system.

4. The radar apparatus in accordance with claim 1, wherein said pulse beam is irradiated to said mirror surfaces at an angle within a predetermined scanning angular zone in the X direction in said three-dimensional coordinate system.

5. The radar apparatus in accordance with claim 1, wherein said pulse beam is irradiated to said mirror surfaces at an angle whose absolute value is in a range of 25° to 70° with respect to the XZ plane in said three-dimensional coordinate system.

6. The radar apparatus in accordance with claim 5, wherein said pulse beam is irradiated to said mirror surfaces at an angle whose absolute value is in a range of 35° to 60° with respect to the XZ plane in said three-dimensional coordinate system.

7. The radar apparatus in accordance with claim 1, wherein said pulse beam transmission means comprises converging means for converging light emitted from said light source to said rotary polygon mirror.

8. The radar apparatus in accordance with claim 1, wherein said pulse beam transmission means comprises a reflecting mirror for directing said pulse beam toward said rotary polygon mirror.

9. The radar apparatus in accordance with claim 1, further comprising calculating means for calculating a relative distance of said object from said radar apparatus based on a difference between generation of said pulse beam and reception of said transmission beam returned from said object positioned in said measuring area.

10. The radar apparatus in accordance with claim 1, further comprising:
    judging means for discriminating whether said object located in said measuring area is a true obstacle; and
    safe distance control means for controlling deceleration control means to maintain a safe distance between said radar apparatus and said object when said object is a true obstacle.

11. A radar apparatus comprising:
    a rotary polygon mirror with a plurality of mirror surfaces inclined at different angles with respect to a rotational axis of said rotary polygon mirror;
    a reflection mirror disposed at an upper front position spaced from said rotary polygon mirror for receiving a pulse beam emitted from a light source and reflecting said pulse beam obliquely downward toward said rotary polygon mirror so that said pulse beam is reflected as a transmission beam advancing toward a measuring area in a forward direction; and
    light receiving means for receiving said transmission beam returned from an object positioned within said measuring area.

12. The radar apparatus in accordance with claim 1, further comprising:
    judging means for discriminating whether said object located in said measuring area is a true obstacle; and
    safe distance control means for controlling deceleration control means to maintain a safe distance between said radar apparatus and said object when said object is a true obstacle.

* * * * *